(12) United States Patent
Park et al.

(10) Patent No.: US 12,223,941 B2
(45) Date of Patent: Feb. 11, 2025

(54) ACTIVE ACOUSTIC RIPPLE CANCELLATION FOR MEMS MIRRORS

(71) Applicant: GOOGLE LLC, Mountain View, CA (US)

(72) Inventors: Sangtak Park, Waterloo (CA); Isaac James Deroche, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 534 days.

(21) Appl. No.: 17/694,845

(22) Filed: Mar. 15, 2022

(65) Prior Publication Data

US 2023/0296879 A1    Sep. 21, 2023

(51) Int. Cl.

| | | |
|---|---|---|
| *G10K 11/178* | (2006.01) | |
| *G01H 9/00* | (2006.01) | |
| *G01H 13/00* | (2006.01) | |
| *G02B 26/08* | (2006.01) | |
| *G02B 27/01* | (2006.01) | |

(Continued)

(52) U.S. Cl.
CPC ......... *G10K 11/17823* (2018.01); *G01H 9/00* (2013.01); *G01H 13/00* (2013.01); *G10K 11/17873* (2018.01); *H04R 1/2869* (2013.01); *H04R 3/02* (2013.01); *H04R 3/04* (2013.01); *G02B 26/0841* (2013.01);

(Continued)

(58) Field of Classification Search
CPC ....... G10K 11/17823; G10K 11/17873; G10K 2210/1291; G01H 9/00; G01H 13/00; H04R 1/2869; H04R 3/02; H04R 3/04; G02B 26/0841; G02B 27/0172; H04N 9/3194

See application file for complete search history.

(56) References Cited

U.S. PATENT DOCUMENTS

| | | | |
|---|---|---|---|
| 2007/0057909 A1* | 3/2007 | Schobben | H04R 1/028 345/156 |
| 2013/0100098 A1 | 4/2013 | Shen et al. | |

(Continued)

FOREIGN PATENT DOCUMENTS

| | | |
|---|---|---|
| CN | 104243848 A | 12/2014 |
| CN | 106648037 A | 5/2017 |

(Continued)

OTHER PUBLICATIONS

Machine Translation of JP-2021124611-A, "Vibration-controlling apparatus, exposure apparatus, method for producing article", 2024, Clarivate Analytics, pp. 1-9. (Year: 2024).*

(Continued)

*Primary Examiner* — Daniel R Sellers

(57) ABSTRACT

Systems, devices, and methods are described for mitigating or eliminating distortion patterns (such as those caused by one or more high-volume audio sources) in a display system such as a laser projection system. Frequency components of an incoming sound that correspond to one or more resonant frequencies of an optical reflector of the display system are determined to exceed a defined volume threshold. Responsive to that determination, a magnitude and phase of one or more harmonic motions of the optical reflector are measured. Sound waves are generated to destructively interfere with at least one frequency component corresponding to the resonant frequencies of the optical reflector.

21 Claims, 8 Drawing Sheets

(51) Int. Cl.
*H04N 9/31* (2006.01)
*H04R 1/28* (2006.01)
*H04R 3/02* (2006.01)
*H04R 3/04* (2006.01)

(52) U.S. Cl.
CPC .. *G02B 27/0172* (2013.01); *G10K 2210/1291* (2013.01); *H04N 9/3194* (2013.01)

(56) References Cited

U.S. PATENT DOCUMENTS

| | | | |
|---|---|---|---|
| 2015/0233814 A1* | 8/2015 | Golovanevsky | G01N 21/01 356/244 |
| 2019/0182415 A1 | 6/2019 | Sivan | |
| 2019/0310467 A1 | 10/2019 | Resler | |
| 2019/0356999 A1 | 11/2019 | Raghuvanshi et al. | |
| 2020/0285047 A1 | 9/2020 | Pu et al. | |
| 2021/0396713 A1* | 12/2021 | Almeida | G01S 7/4817 |
| 2022/0035150 A1 | 2/2022 | Park et al. | |
| 2023/0368769 A1* | 11/2023 | Akiyama | G10K 11/17857 |

FOREIGN PATENT DOCUMENTS

| | | | |
|---|---|---|---|
| JP | 03054515 A | 3/1991 | |
| JP | 2021124611 A * | 8/2021 | ......... G03F 7/70883 |

OTHER PUBLICATIONS

Translation of Taiwanese Office Action mailed Nov. 2, 2023 for TW Application No. 111146099, 8 pages.
Communication under Rule 71(3) EPC mailed Jan. 24, 2024 for EP Application No. 23705138.8, 45 pages.
International Search Report and Written Opinion mailed Apr. 6, 2023 for PCT/US2023/010904, 11 pages.
Amor et al. 'Multiple MEMS Mirrors Synchronization Techniques, Modeling and Applications', https://www.st.com/content/dam/artificialintelligence/papers/stmicroelectronics-multiple-mems-mirrors-synchronization-techniques.pdf, Mar. 5, 2021, 11 pages.
International Preliminary Report on Patentability mailed Sep. 26, 2024 for PCT Application No. PCT/US2023/010904, 8 pages.

* cited by examiner

ACTIVE ACOUSTIC RIPPLE CANCELLATION FOR MEMS MIRRORS

BACKGROUND

Wearable electronic eyewear devices include optical systems that deliver a virtual image into the field of view (FOV) of a user (also termed the user's "eye box"). The device also allows the user to see the outside world through a lens or see-through eyepiece. Some wearable electronic eyewear devices incorporate a near-to-eye optical system to display content to the user. These devices are sometimes referred to as head-mounted displays (HMDs) or near-eye displays (NEDs). For example, conventional HMD device designs include a microdisplay ("display") positioned in a temple or rim region of a head wearable frame like a conventional pair of eyeglasses. The display generates images such as computer-generated images (CGI) that are conveyed into the FOV of the user by optical elements such as one or more optical reflectors (e.g., one or more micro-electromechanical system (MEMS)-based scan mirrors), and one or more lightguides or waveguides deployed in the lens (or "optical combiner") of the head wearable frame. The wearable electronic eyewear device can therefore serve as a hardware platform for implementing augmented reality (AR), mixed reality (MR), or both. Different modes of augmented reality include optical see-through augmented reality, video see-through augmented reality, or opaque (VR) modes.

However, components of optical systems such as those described above (such as quasi-static MEMS mirrors and/or other MEMS mirrors) are sensitive to vibrations from internal and external disturbances, which may negatively affect display output.

BRIEF SUMMARY OF PARTICULAR EMBODIMENTS

Embodiments are described herein for mitigating or eliminating distortion patterns (such as those caused by one or more high-volume audio sources) in a display system such as a laser projection system (LPS) or laser beam scanning (LBS) system. Frequency components of an incoming sound that correspond to one or more resonant frequencies of an optical reflector of the display system are determined to exceed a defined volume threshold. Responsive to that determination, a magnitude and phase of one or more harmonic motions of the optical reflector are measured. Sound waves are generated to destructively interfere with at least one frequency component corresponding to the resonant frequencies of the optical reflector.

In certain embodiments, a method may comprise determining, by a display controller and via one or more microphones communicatively coupled to the display controller, that one or more frequency components of an incoming sound exceed a defined volume threshold, the one or more frequency components corresponding to one or more resonant frequencies of an optical reflector communicatively coupled to the display controller; responsive to the determining, measuring a magnitude and phase of harmonic motions of the optical reflector; and generating sound waves to destructively interfere with at least one frequency component of the one or more frequency components.

Generating the sound waves may be based at least in part on the measured magnitude and/or measured phase of the one or more harmonic motions.

The measuring of the magnitude and phase of the one or more frequency components may include determining one or more properties of the optical reflector, the one or more properties comprising at least one of a group that includes a rotation position of the optical reflector, an angular displacement of the optical reflector, or an angle of the optical reflector.

The measuring of the magnitude and phase may be based at least in part on a difference of respective capacitances between a rotor of the optical reflector and a first stator of the optical reflector and between the rotor and a second stator of the optical reflector.

Generating the sound waves may be based at least in part on the measured magnitude and phase of the one or more harmonic motions of the optical reflector.

Measuring the magnitude and phase of the one or more harmonic motions of the optical reflector may include measuring the magnitude and phase of the harmonic motions at the one or more resonant frequencies.

The optical reflector may comprise a micro-electromechanical system (MEMS)-based scan mirror.

At least one of the one or more resonant frequencies of the optical reflector may be within a frequency range of 600-660 Hz.

Generating the sound waves may be performed via one or more audio speakers communicatively coupled to the display controller, and in operation, the one or more audio speakers may be used for user communications and/or user media consumption.

In operation, the one or more microphones may be used for user communications.

In certain embodiments, a display system may comprise an optical reflector and a display controller communicatively coupled to the optical reflector and to one or more microphones, such that the display controller is configured to determine, via the one or more microphones, that one or more frequency components of an incoming sound exceed a defined volume threshold, the one or more frequency components corresponding to one or more resonant frequencies of the optical reflector; to measure, based on the determination that the one or more frequency components exceed the defined volume threshold, a magnitude and phase of one or more harmonic motions of the optical reflector; and to generate, based at least in part on the measured magnitude and/or phase of the one or more harmonic motions, sound waves that destructively interfere with at least one frequency component of the one or more frequency components.

To generate the sound waves may include to generate the sound waves based at least in part on the measured magnitude and/or measured phase of the one or more harmonic motions.

To measure the magnitude and phase of the one or more frequency components may include to determine one or more properties of the optical reflector, the one or more properties comprising at least one of a group that includes a rotation position of the optical reflector, an angular displacement of the optical reflector, or an angle of the optical reflector.

To measure the magnitude and phase may be based at least in part on a difference of respective capacitances between a rotor of the optical reflector and a first stator of the optical reflector and between the rotor and a second stator of the optical reflector.

To generate the sound waves may be based at least in part on the measured magnitude and phase of the one or more harmonic motions of the optical reflector.

To measure the magnitude and phase of the one or more harmonic motions of the optical reflector may include to measure the magnitude and phase of the harmonic motions at the one or more resonant frequencies.

The optical reflector may comprise a micro-electromechanical system (MEMS)-based scan mirror.

At least one of the one or more resonant frequencies of the optical reflector may be within a frequency range of 200-2000 Hz.

To generate the sound waves may include to generate the sound waves via one or more audio speakers communicatively coupled to the display controller, such that in operation, the one or more audio speakers may be used for user communications and/or user media consumption.

In operation, the one or more microphones may be used for user communications.

In certain embodiments, a method may comprise measuring, in response to determining that one or more frequency components of sound received at a display device exceed a defined volume threshold and correspond to one or more resonant frequencies of an optical reflector of the display device, a magnitude and phase of one or more harmonic motions of the optical reflector; and, based at least in part on the measuring, generating sound waves to destructively interfere with at least one frequency component of the one or more frequency components.

In certain embodiments, a head-mounted display (HMD) device may comprise an optical reflector, one or more microphones, one or more audio speakers, and a display controller communicatively coupled to the optical reflector, to the one or more microphones, and to the one or more audio speakers. The display controller may be configured to determine, via the one or more microphones, that one or more frequency components of an incoming sound exceed a defined volume threshold, the one or more frequency components corresponding to one or more resonant frequencies of the optical reflector; to measure a magnitude and phase of one or more harmonic motions of the optical reflector; and to generate, via the one or more audio speakers, sound waves that destructively interfere with at least one frequency component of the one or more frequency components.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

Figure 1:
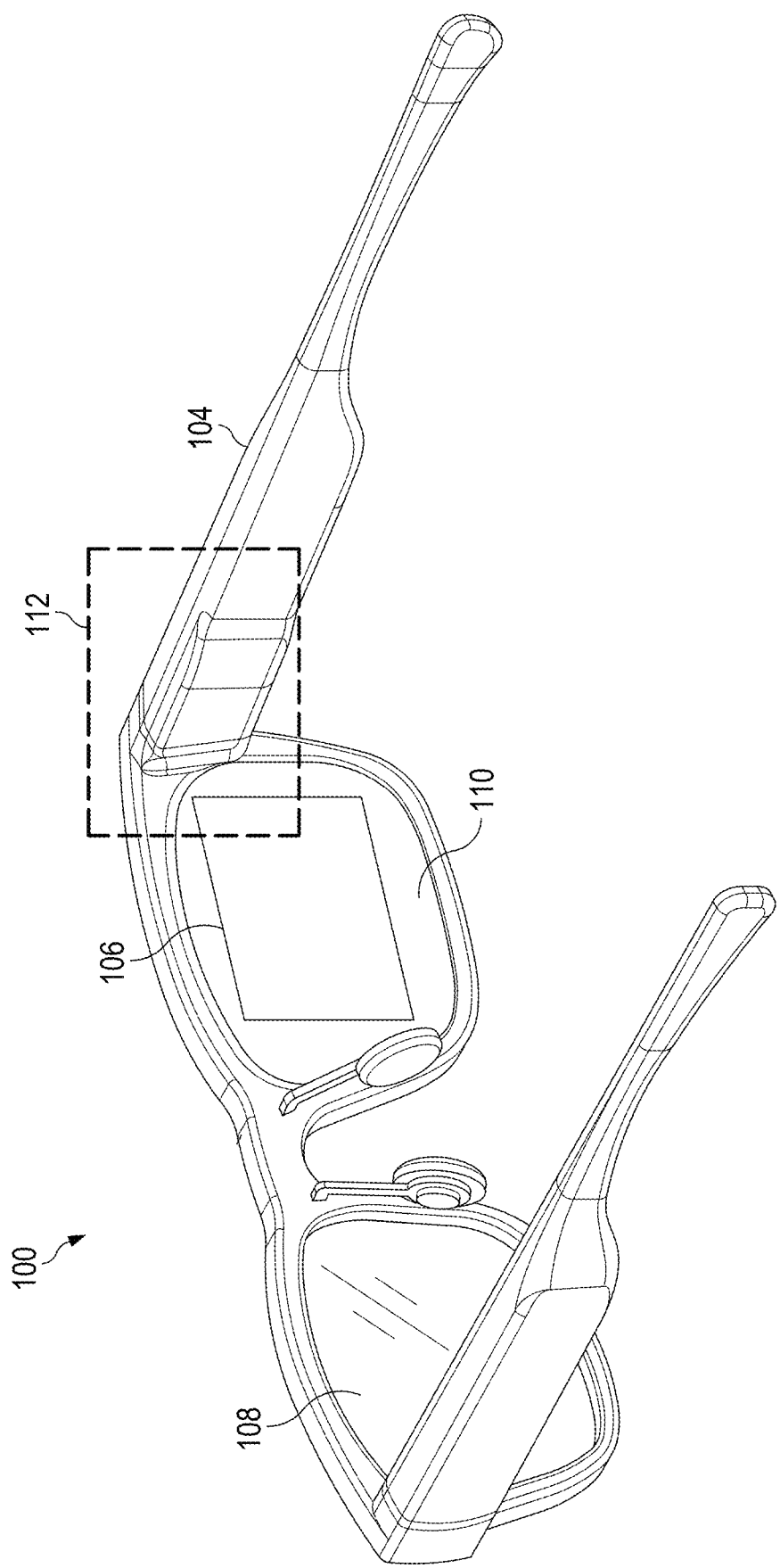
FIG. 1 illustrates a display system having an integrated laser projection system, in accordance with some embodiments.

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawings.

DETAILED DESCRIPTION

Head-mounted display (HMD) devices that rely on laser scanning projectors potentially have multiple practical and leisure applications, but the development and adoption of such wearable electronic eyewear devices have been limited by constraints imposed by the quality, cost, size, weight, thickness, field of view (FOV), and efficiency of the optical systems used to implement existing eyewear devices. For example, the geometry and physical constraints of conventional designs lead to a low FOV for the display. In addition, such laser scanning projectors are sensitive to vibrations from internal and external disturbances, which may negatively affect display output.

A feedback control for an optical reflector (such as an optical reflector utilizing a quasi-static MEMS mirror) may correct certain ripples caused by transients and external disturbances from many environments. However, the ripples or other distortion effects caused by high-volume sound via acoustic and/or structural coupling might not be similarly corrected due in part to limitations regarding the actuation voltage and control bandwidth associated with the optical reflector. Thus, while typical HMD devices may be enabled to compensate for certain distortion effects, the visual display components of such devices may still be affected by high-volume audio sources, such as large engines, industrial equipment, concert venues, and the like. These high-volume audio sources may cause visual distortion effects that affect sensitive display components of the HMD device and thereby negatively affect user experience. Such visual distortion effects may include one or more instances of banding, color shift, unintended display patterns, etc. In certain scenarios, these visual distortion effects may result from a series of stretches and/or compressions of images projected via a laser beam scanning (LBS) projector when that projector is exposed to one or more high-volume audio sources.

For example, a user exposed to high-volume audio sources while wearing a pair of AR glasses in front of audio speakers at a rock concert or loud machinery at their workplace might experience a series of stretches and compressions of projected images within a frame in a scanning direction of one or more optical reflectors. In such situations, high-volume sound emitted by an audio speaker or loud machinery may excite low-frequency resonant modes of the quasi-static MEMS mirror, such as with respect to torsional motion and/or out-of-plane (piston) motion of the MEMS mirror via acoustic coupling and/or structural coupling.

Systems and methods described herein generally relate to spatial light modulators. In particular, the present disclosure describes active ripple cancellation (ARC) methods and systems for utilizing destructive interference to mitigate or cancel distortion effects (such as those caused by one or more high-volume audio sources) affecting visual display elements of an HMD device that includes a spatial light modulator using one or more optical reflectors. Responsive to determining that one or more resonant frequency components of an incoming sound exceed a defined volume threshold—such as frequency components that correspond to resonant frequencies of an optical reflector in the display system—an ARC system measures a magnitude and phase of one or more harmonic motions of the optical reflector. Based on the measured magnitude and/or phase, the ARC system selectively generates sound waves to destructively interfere with at least one of the resonant frequency components. As one non-limiting example, in some embodiments the defined volume threshold is a threshold beyond which external audio sources are likely to result in one or more undesirable harmonic motions of the optical reflector.

Thus, embodiments described herein use one or more audio speakers to generate sound to cause destructive interference with incoming high-volume sound, such that the destructive interference cancels out the ripples and/or any related spurious motions of one or more optical reflectors (e.g., scan mirrors) of the HMD device. In various embodiments, typical high-volume audio sources likely to cause such distortion effects often occur around 600-660 Hz at a volume of ~100 dB. By measuring a magnitude and phase of any sound having a component of a corresponding frequency band (again, around 600-660 Hz), embodiments of techniques described herein initiate the generation of destructive interference for any signal exceeding a selected threshold magnitude (for example, a threshold magnitude corresponding to ~90 dB or greater).

In certain embodiments, one or more optical reflectors utilized in a spatial light modulator include one or more MEMS-based scan mirrors. In certain embodiments, a position attribute of the optical reflector comprises a position attribute of a rotor of the optical reflector. In certain embodiments, the position attribute comprise one or more of: a rotation position of the rotor, an angular displacement of the rotor, and an angle of the rotor relative to an inner stator or an outer stator of the optical reflector.

Determining the position attribute of the optical reflector becomes significant in some applications of the optical reflector. For example, when the optical reflector is implemented in laser scanning projection systems, the position attribute of the optical reflector needs to be accounted for to project an image or to optimize the quality of a projected image.

In certain embodiments, a scanning laser projector system comprises a spatial light modulator to scan at least one laser beam over a display area. The spatial light modulator comprises one or more optical reflectors, such as micro-electromechanical system (MEMS)-based scanning reflectors (also termed scan mirrors). In various embodiments, the spatial light modulator includes two optical reflectors that comprise a horizontal scan mirror and a vertical scan mirror, each of which respectively scans in orthogonal directions to cooperate to generate an output of the scanning laser projector system. The horizontal scan mirror is a fast-axis mirror, and the vertical scan mirror is a slow axis mirror in some embodiments. The fast-axis mirror operates (e.g., scans) at a higher frequency than the slow axis mirror, which may also be referred to as a quasi-static mirror. In certain embodiments, the slow-axis mirror is operated to scan in one direction over a display area for most of its movement period, and to quickly return to the original position during the remainder of the period. In other examples, the slow-axis mirror oscillates according to a sinusoidal or triangular function. Further, the nomenclature of "horizontal" and "vertical" is not limiting: The fast-axis mirror and the slow-axis mirror may be in any appropriate orientation which allows a two-dimensional image to be projected.

Generally, an operation (e.g. scanning operation) of the slow axis mirror is synchronized with the fast axis mirror to generate an output at the scanning laser projector system. In certain embodiments, the operation of the slow axis mirror is controlled, and thus synchronized with the fast axis mirror by determining (e.g., sensing) a position attribute of the slow axis mirror. The position attribute of the slow axis mirror may comprise a rotational position, angular displacement, or angle of the slow axis mirror. By determining the position attribute of the slow axis mirror, an angular displacement and velocity of the slow axis mirror may be controlled in a closed loop, while rejecting external disturbances. In addition, such position attributes of an optical reflector may be utilized measure a magnitude and phase of undesirable harmonic motions of that optical reflector, enabling active cancellation (e.g., via destructive interference) of those undesirable harmonic motions that may otherwise cause distortion patterns to be displayed by an incorporating display system.

Although some embodiments of the present disclosure are described and illustrated with reference to a particular example near-eye display system in the form of a wearable HMD device, it will be appreciated that the apparatuses and techniques of the present disclosure are not limited to this particular example, but instead may be implemented using techniques described herein in any of a variety of display systems or other systems (e.g., laser imaging, detection, and ranging or LIDAR systems) that utilize one or more MEMS mirrors. Similarly, although some embodiments of the present disclosure are for purposes of simplicity described and illustrated with reference to a display system utilizing a single monocular projection system, additional embodiments using techniques described herein may be implemented with multiple display areas, such as those in which the display is formed across multiple FOV areas, including binocular display systems.

FIG. 1 illustrates an example display system 100 having a support structure 102 that includes an arm 104, which houses a laser projection system configured to project images toward the eye of a user, such that the user perceives the projected images as being displayed in a field of view (FOV) area 106 of a display at one or both of lens elements 108, 110. In the depicted embodiment, the display system 100 is a wearable HMD device that includes a support structure 102 configured to be worn on the head of a user and has a general shape and appearance of an eyeglasses (e.g., sunglasses) frame. The support structure 102 contains or otherwise includes various components to facilitate the projection of such images toward the eye of the user, such as a laser projector, an optical scanner, and a waveguide. In certain embodiments, the support structure 102 further includes one or more audio transmission facilities (e.g., audio speakers), such as for user communication, media consumption, etc. In some embodiments, the support structure 102 further includes various sensors, such as one or more microphones, front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, etc. Furthermore, in some embodiments the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments the display system 100 may have a different shape and appearance from the eyeglasses frame depicted in FIG. 1.

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler of the waveguide to an outcoupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

In some embodiments, the projector is a digital light processing-based projector, a scanning laser projector, or any combination of a modulative light source such as a laser or one or more LEDs and a dynamic reflector mechanism such as one or more dynamic scanners or digital light processors. In some embodiments, the projector includes multiple laser diodes (e.g., a red laser diode, a green laser diode, and/or a blue laser diode) and at least one scan mirror (e.g., two one-dimensional scan mirrors, which may be micro-electromechanical system (MEMS)-based, voice-coil based, or piezo-based). The projector is communicatively coupled to a controller (not shown) and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100. The projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. Generally, it is desirable for a display to have a wide FOV to accommodate the outcoupling of light across a wide range of angles. Herein, the range of different user eye positions that will be able to see the display is referred to as the eyebox of the display.

In some embodiments, the projector routes light via first and second scan mirrors, an optical relay disposed between the first and second scan mirrors, and a waveguide disposed at the output of the second scan mirror. In some embodiments, at least a portion of an outcoupler of the waveguide may overlap the FOV area 106. These aspects are described in greater detail below.

Figure 2:
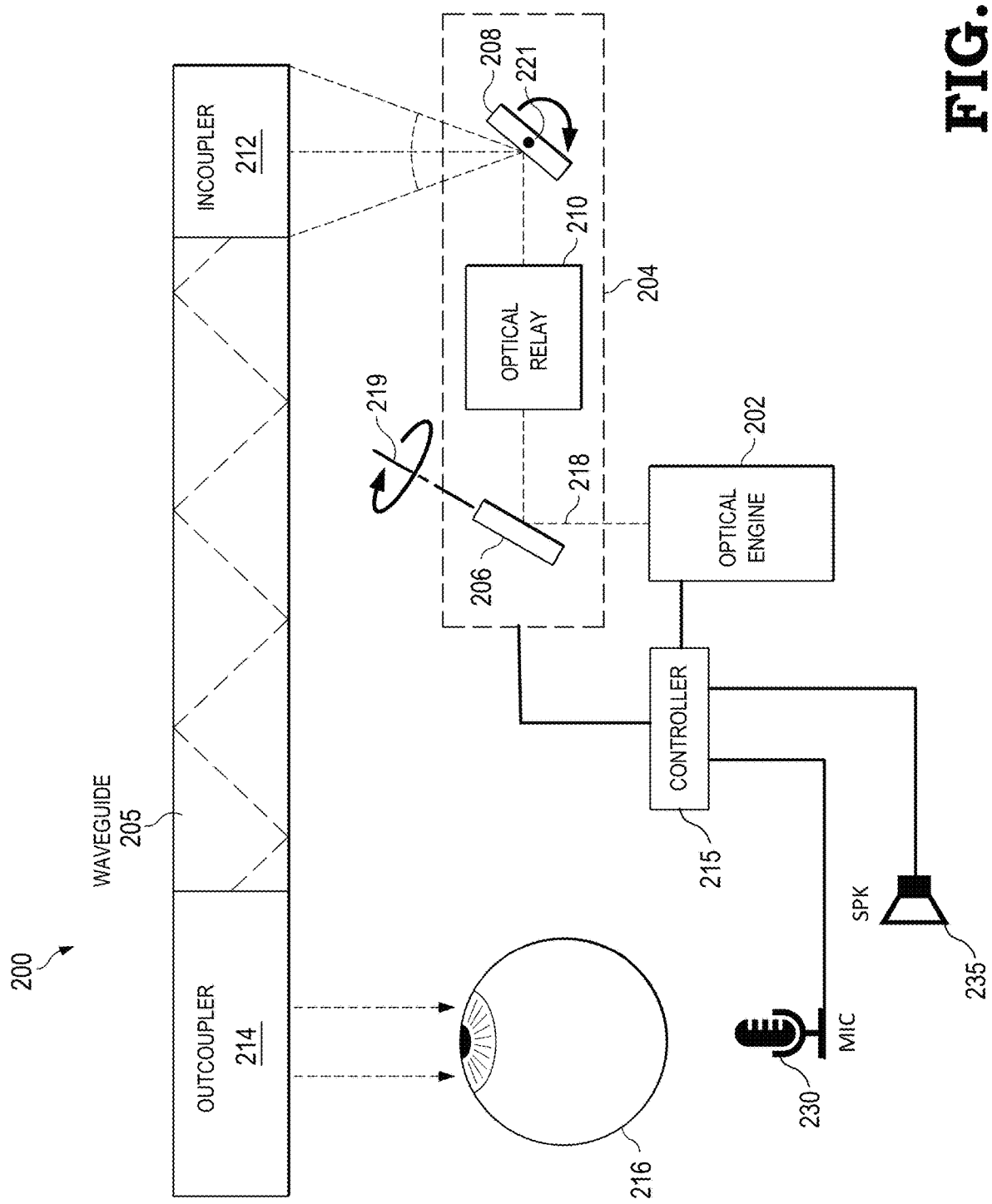
FIG. 2 illustrates a laser projection system having an optical scanner that includes an optical relay disposed between two scan mirrors, in accordance with some embodiments.

FIG. 2 illustrates a simplified block diagram of a laser projection system 200 that projects images directly onto the eye of a user via laser light. The laser projection system 200 includes an optical engine 202; an optical scanner 204; a controller 215, communicatively coupled to both the optical engine 202 and the optical scanner 204, as well as to an audio speaker 235 and microphone 230; and a waveguide 205. The optical scanner 204 includes a first scan mirror 206, a second scan mirror 208, and an optical relay 210. The waveguide 205 includes an incoupler 212 and an outcoupler 214, with the outcoupler 214 being optically aligned with an eye 216 of a user in the present example. In some embodiments, the laser projection system 200 is implemented in a HMD device or other display system, such as the display system 100 of FIG. 1.

The optical engine 202 includes one or more laser light sources configured to generate and output laser light 218 (e.g., visible laser light such as red, blue, and green laser light and/or non-visible laser light such as infrared laser light). The optical engine 202 is coupled to a controller 215, which controls the timing of emission of laser light from the laser light sources of the optical engine 202 in accordance with instructions received by a processor of the controller 215 to modulate the laser light 218 to be perceived as images when output to the retina of an eye 216 of a user. The controller 215 is also communicatively coupled to the optical scanner 204, such as to control one or more aspects of actuation and oscillation of scan mirrors 206 and/or 208.

During operation of the laser projection system 200, multiple laser light beams having respectively different wavelengths are output by the laser light sources of the optical engine 202, then combined via a beam combiner (not shown), before being directed to the eye 216 of the user. The optical engine 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

In certain embodiments, one or both of the scan mirrors 206 and 208 of the optical scanner 204 are MEMS mirrors. For example, the scan mirror 206 and the scan mirror 208 are MEMS mirrors that are driven by respective actuation voltages to oscillate during active operation of the laser projection system 200, causing the scan mirrors 206 and 208 to scan the laser light 218. Oscillation of the scan mirror 206 causes laser light 218 output by the optical engine 202 to be scanned through the optical relay 210 and across a surface of the second scan mirror 208. The second scan mirror 208 scans the laser light 218 received from the scan mirror 206 toward an incoupler 212 of the waveguide 205. In some embodiments, the scan mirror 206 oscillates or otherwise rotates around a first axis 219, such that the laser light 218 is scanned in only one dimension (i.e., in a line) across the surface of the second scan mirror 208. In some embodiments, the scan mirror 208 oscillates or otherwise rotates around a second axis 221. In some embodiments, the first axis 219 is skew with respect to the second axis 221.

In some embodiments, the incoupler 212 has a substantially rectangular profile and is configured to receive the laser light 218 and direct the laser light 218 into the waveguide 205. The incoupler 212 is defined by a smaller dimension (i.e., width) and a larger orthogonal dimension (i.e., length). In an embodiment, the optical relay 210 is a line-scan optical relay that receives the laser light 218 scanned in a first dimension by the first scan mirror 206 (e.g., the first dimension corresponding to the small dimension of the incoupler 212), routes the laser light 218 to the second scan mirror 208, and introduces a convergence to the laser light 218 (e.g., via collimation) in the first dimension to an exit pupil plane of the optical relay 210 beyond the second scan mirror 208. Herein, an "exit pupil plane" in an optical system refers to the location along the optical path where light converges to a virtual aperture before exiting the optical system. For example, the possible optical paths of the laser light 218, following reflection by the first scan mirror 206, are initially spread along a first scanning axis, but later these paths intersect at an exit pupil beyond the second scan mirror 208 due to convergence introduced by the optical relay 210. For example, the width (i.e., smallest dimension) of a given exit pupil approximately corresponds to the diameter of the laser light corresponding to that exit pupil. Accordingly, the exit pupil can be considered a "virtual aperture," In some embodiments, the exit pupil plane of the optical relay 210 is coincident with the incoupler 212. In some embodiments, an entrance pupil plane of the optical relay 210 is coincident with the first scan mirror 206.

According to various embodiments, the optical relay 210 includes one or more spherical, aspheric, parabolic, or freeform lenses that shape and direct the laser light 218 on the second scan mirror 208, and/or includes a molded reflective relay that includes two or more optical surfaces that include, but are not limited to, spherical, aspheric, parabolic, or freeform lenses or reflectors (sometimes referred to as "reflective surfaces" herein), which shape and direct the laser light 218 onto the second scan mirror 208. The second scan mirror 208 receives the laser light 218 and scans the laser light 218 in a second dimension, the second dimension corresponding to the long dimension of the incoupler 212 of the waveguide 205. In some embodiments, the second scan mirror 208 causes the exit pupil of the laser light 218 to be swept along a line along the second dimension. In some embodiments, the incoupler 212 is positioned at or near the swept line downstream from the second scan mirror 208 such that the second scan mirror 208 scans the laser light 218 as a line or row over the incoupler 212.

In some embodiments, the optical engine 202 includes a laser emitter, such as an edge-emitting laser (EEL), that emits a laser light 218 having a substantially elliptical, non-circular cross-section. The optical relay 210 magnifies or minimizes the laser light 218 along one or both of a first direction (e.g., the semi-major axis of the beam profile of the laser light 218) or a second direction (e.g., the semi-minor axis of the beam profile of the laser light 218) to circularize the laser light 218 prior to convergence of the laser light 218 on the second scan mirror 208. In some such embodiments, a surface of a mirror plate of the first scan mirror 206 is elliptical and non-circular (e.g., similar in shape and size to the cross-sectional area of the laser light 218). In other such embodiments, the surface of the mirror plate of the first scan mirror 206 is circular.

The waveguide 205 of the laser projection system 200 includes the incoupler 212 and the outcoupler 214. The term "waveguide," as used herein, will be understood to mean a combiner using one or more of total internal reflection (TIR), specialized filters, and/or reflective surfaces, to transfer light from an incoupler (such as the incoupler 212) to an outcoupler (such as the outcoupler 214). In some display applications, the light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, and/or surface relief holograms. In some embodiments, a given incoupler or outcoupler is configured as a transmissive grating (e.g., a transmissive diffraction grating or a transmissive holographic grating) that causes the incoupler or outcoupler to transmit light and that may apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the laser light 218 received at the incoupler 212 is propagated to the outcoupler 214 via the waveguide 205 using TIR. The laser light 218 is then output to the eye 216 of a user via the outcoupler 214. As described above, in some embodiments the waveguide 205 is implemented as part of an eyeglass lens, such as the lens 108 or lens 110 (FIG. 1) of the display system having an eyeglass form factor and employing the laser projection system 200.

Although not shown in the example of FIG. 2, in some embodiments additional optical components are included in any of the optical paths between the optical engine 202 and the scan mirror 206, between the scan mirror 206 and the optical relay 210, between the optical relay 210 and the scan mirror 208, between the scan mirror 208 and the incoupler 212, between the incoupler 212 and the outcoupler 214, and/or between the outcoupler 214 and the eye 216 (e.g., in order to shape the laser light for viewing by the eye 216 of the user). For example, in some embodiments, a prism is used to steer light from the scan mirror 208 into the incoupler 212 so that light is coupled into incoupler 212 at the appropriate angle to encourage propagation of the light in waveguide 205 by TIR. As another example, in some embodiments, an exit pupil expander such as a fold grating may be arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 216 of the user).

While respectively represented in the example embodiment of FIG. 2 by a single microphone and single audio speaker, reference herein to microphone 230 and/or audio speaker 235 may, in various embodiments, refer to one or more individual such components. For example, in certain embodiments, microphone 230 may comprise one or more microphone arrays, each including multiple such sensors. Similarly, in various embodiments, audio speaker 235 may comprise one or more arrangements of multiple audio speakers, such as intended for use to replicate various desirable media configurations (e.g., stereo configurations, surround sound configurations, concert and/or stadium configurations, or any other arrangement, including those intended for compliance with one or more audiological, musical, and/or theatrical industry standards). In at least some embodiments, in order to avoid potentially negative design implications of incorporating additional audio or other sensors into a size- and weight-sensitive HMD device package, ARC functionality may be provided for one or more MEMS mirrors (e.g. a quasi-static MEMS mirror) in an HMD device using one or more microphones and/or audio speakers already incorporated by the HMD device, such as for user communication, media consumption, and the like. For example, with respect to the embodiment of FIG. 2, microphone 230 and audio speaker 235 may not be exclusively used for the measuring and destructive interference facilities associated with various ARC techniques described herein, but are also used for user communication and media consumption during operations of an HMD device that incorporates the laser projection system 200. However, it will be appreciated that in certain embodiments (such as those intended for regular use in high-volume sound environments) specialized components may be utilized, such as one or more microphones and/or audio speakers intended for exclusive or primary use in ARC operations.

Figure 3:
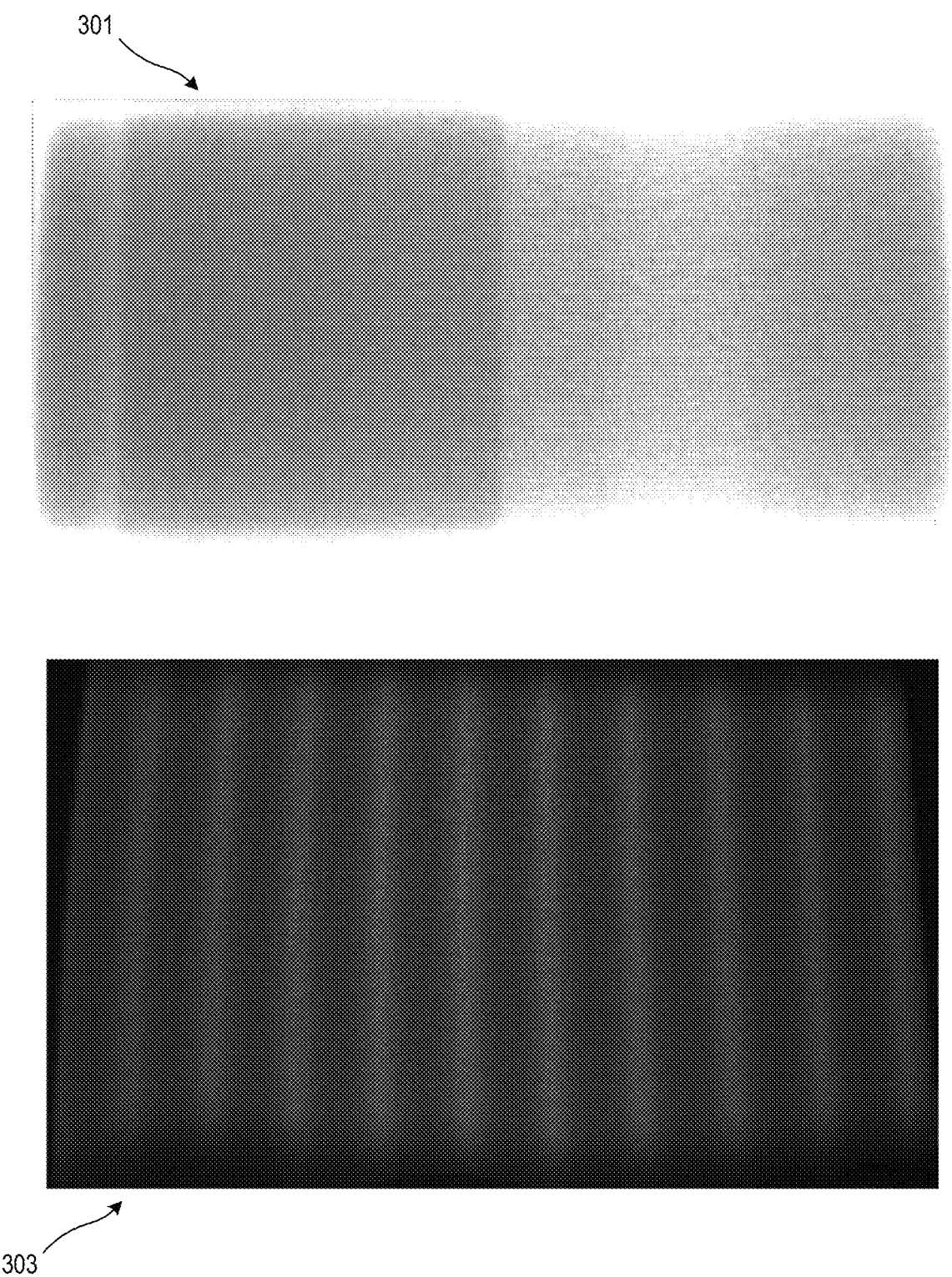
FIG. 3 illustrates example distortion patterns that may appear on a head-mounted display as a result of one or more external high-volume audio sources.

FIG. 3 illustrates example ripple or banding distortion patterns that may appear on a display of an HMD device, such as a result of one or more high-volume audio sources causing undesirable harmonic motions of an optical reflector of the HMD device. In particular, banded distortion pattern 301 and ripple distortion pattern 303 are each examples of undesirable artifacts that may be displayed by an HMD device when that HMD device is subjected to one or more such high-volume audio sources. It will be appreciated that although for purposes of clarity the distortion patterns 301 and 303 are depicted here in isolation, such as may appear when a solid-color image is projected across the FOV provided by a scanning laser projector (e.g., FOV area 106 of FIG. 1), in various scenarios such distortion patterns may be displayed in conjunction with one or more images and/or video frames as well.

Figure 4:
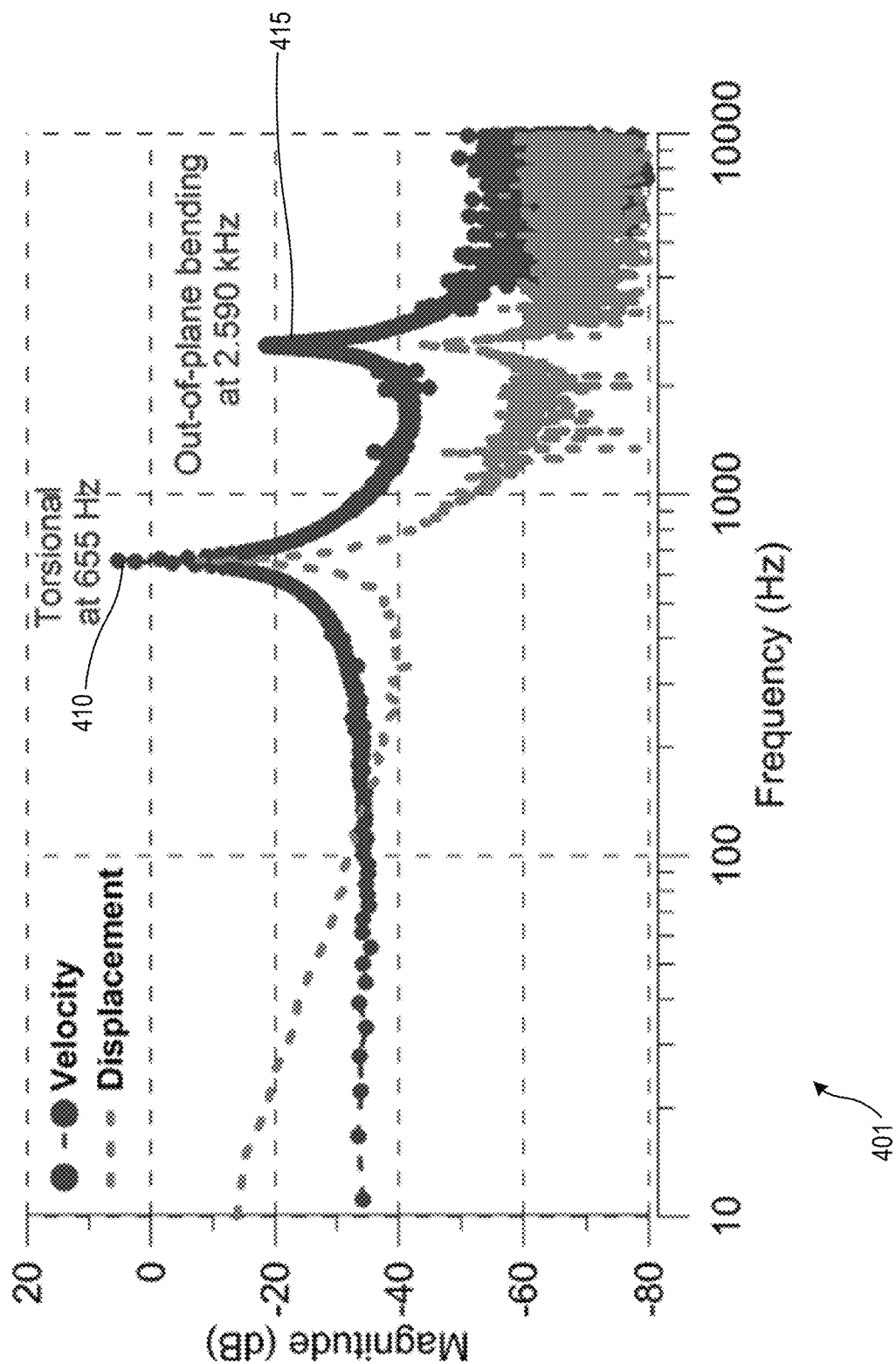
FIG. 4 illustrates an eigenvalue analysis graph 401 of undesirable displacement patterns for a quasi-static MEMS mirror associated with various high-volume sound sources affecting an incorporating HMD device.

FIG. 4 illustrates an eigenvalue analysis graph 401 of undesirable harmonic motions of a quasi-static MEMS mirror associated with various high-volume sound sources affecting an incorporating HMD device. For the depicted eigenvalue frequency analysis, harmonic motions in the form of displacement vibrations were measured by a laser Doppler vibrometer (LDV) using a scanning laser projector that incorporates the targeted MEMS mirror as an optical reflector (e.g., scan mirrors 206 and 208 of FIG. 2, and/or optical reflector 515 of FIG. 5). As seen in the analysis graph 401, the measured harmonic motion of the optical reflector has a first peak 410 corresponding to torsional displacement at a frequency of 655 Hz, and a second peak 415 corresponding to out-of-plane bending at a frequency of 2.590 kHz. Based on a measured magnitude and phase of the harmonic motions of the optical reflector at those frequencies, a controller communicatively coupled to the optical reflector selectively generates destructive interference via one or more audio speakers of the incorporating HMD device, thereby mitigating, eliminating, and/or avoiding any distortion patterns (such as those similar to distortion patterns 301 and 303 of FIG. 3) that would otherwise appear on the display of the HMD device as a result of the incoming high-volume audio signals.

Generally, a position sensing device (PSD) can be used to optically measure the angle or angular displacement of a mirror (e.g., the slow axis mirror). However, such a PSD may have a relatively large form factor and may also be associated with high power consumption. Such PSDs may not be suitable for HMD applications, in which small size and low power consumption are desirable. For example, employing the PSD may not be suitable for wearables, such as but not limited to, an HMD device. Thus, in certain embodiments an angle-sensing circuit may be utilized in order to obviate the need for a separate optical PSD, and as such may provide savings to size, weight, or power consumption of a device or system which may incorporate the optical reflector.

Figure 5:
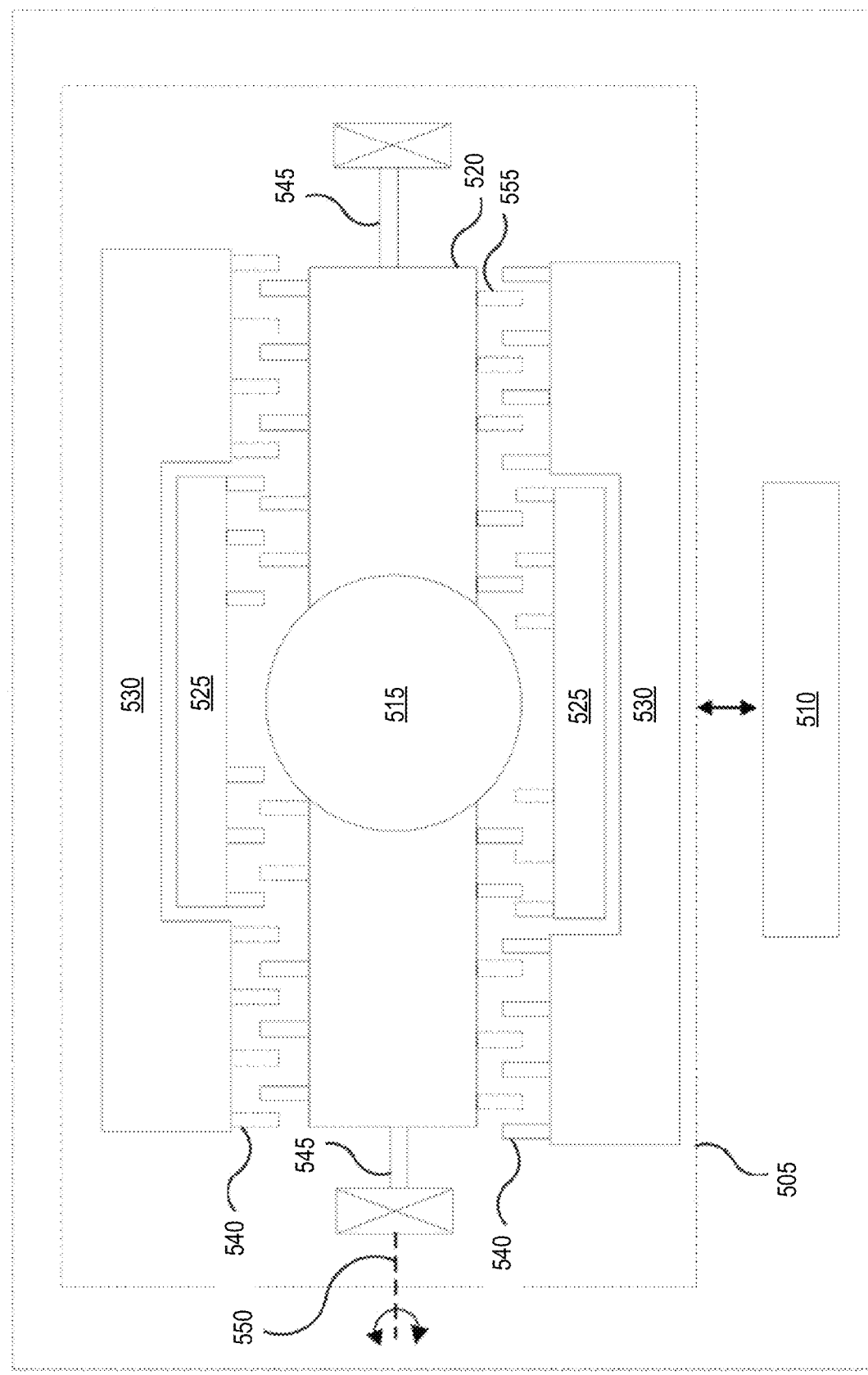
FIG. 5 illustrates a schematic representation of an example portion of a display system to spatially modulate light, in accordance with some embodiments.

FIG. 5 shows a schematic representation of an example system 500 to spatially modulate light in accordance with one or more embodiments. The system 500 comprises an optical reflector 505 (which may be an implementation of one of scan mirrors 206 and 208 of FIG. 2) and a controller 510 (which may be an implementation of controller 215 of FIG. 2). The optical reflector 505 comprises a rotor 520, and inner stators 525 (referred to as the stator 525, henceforth), and outer stators 530 (referred to as stator 530, henceforth). In certain embodiments, the inner stator 525 may also be referred to as the first stator, and the outer stator 530 may also be referred to as the second stator. Although FIG. 5 shows two inner stators 525 and two outer stators 530, it is contemplated that the optical reflector 505 may comprise other arrangements of stators and rotor, or a different number of stators. In certain embodiments, the optical reflector 505 may comprise a rotor, one inner stator, and one outer stator.

The rotor 520 comprises a mirror 515. In certain embodiments, the mirror 515 comprises a metallic coating, such as but not limited to an aluminum (Al) coating. The rotor 520 and the stators 525, 530 cooperate to form an actuator for the optical reflector 505.

The rotor 520 rotates or oscillates about its axis, hence rotating or oscillating the mirror 515 with respect to the stator 525. The rotor 520, and thus mirror 515, rotates or oscillates about its axis 550 through a pair of torsional bars 545. In certain embodiments, the torsional bars 545 comprise torsional hinges.

In certain embodiments, the rotor 520 is a comb-shaped rotor, and the stators 525, 530 are comb-shaped stators. The comb-shaped rotor 520 has outwardly projecting structures 535. The structures 535 interdigitate with projecting structures 540 of the comb-shaped stator 525 and/or of the comb-shaped stator 530 in some embodiments. Structures 535 project towards projecting structures 540 of stators 525 and 530. The structures 535 are referred to as rotor combs 535, and the structures 540 are referred to as stator combs 540. The rotor combs 535 interdigitate with the stator combs 540 to form comb drives providing an electrostatic actuation mechanism for the optical reflector 505.

In the illustrated embodiment of FIG. 5, a top plan view or perspective of the system 500 is shown. From this perspective, the rotor 520, and the stators 525, and 530 define a plane, when the rotor 520 is in its neutral position (e.g., when the rotor 520 is in its resting position). In certain embodiments, the stator combs 540 of the stator 525 are offset in the out-of-plane direction from the stator combs 540 of the stator 530. Moreover, the rotor combs 535 of rotor 520 are variously offset in the out-of-plane direction relative to the combs of stators 525 and 530. In FIG. 5, dashing is used to indicate the combs (also termed teeth) that are further into the page or further away from the viewer in the top perspective shown in FIG. 5. The combs shown in solid lines are closer to the viewer in the top perspective shown in FIG. 5. These relative positions of the combs describe the relative positions of the combs when rotor 520 is in its neutral or resting position. Such a neutral or resting position is the position of rotor 520 relative to the stators 525, 530 when no electrical potential is applied between rotor 520 and the stators 525, 530 in some embodiments.

Moreover, the relative positions of the combs of rotor 520 and stators 525 and 530 allows the electrostatic actuator formed between rotor 520 and stator 525 to rotate or deflect rotor 520 about axis 550 of rotation in a first direction, and the electrostatic actuator formed between rotor 520 and stator 530 to rotate or deflect rotor 520 about axis 550 of rotation in a second direction opposite the first direction. In other words, applying a voltage between rotor 520 and stator 525 attracts the combs of rotor 520 and stator 525 towards each other, thereby rotating or deflecting rotor 520 about axis 550 in the first direction. This movement or deflection also increases the distance or separation between the combs of rotor 520 and stator 530, and decreases the surface area between rotor 520 and stator 530. As such, deflection or rotation of rotor 520 in the first direction causes an increase in the capacitance between rotor 520 and stator 525, while decreasing the capacitance between rotor 520 and stator 530.

Similarly, applying a voltage between rotor 520 and stator 530 attracts the combs of rotor 520 and stator 530 towards each other, thereby rotating or deflecting rotor 520 about axis 550 in the second direction. This movement or deflection also increases the distance or separation between the combs of rotor 520 and stator 525, and decreases the surface area between rotor 520 and stator 525. As such, deflection or rotation of rotor 520 in the second direction causes an increase in the capacitance between rotor 520 and stator 530, while decreasing the capacitance between rotor 520 and stator 525. Furthermore, since rotor 520 oscillates about axis 550 and may not be able to rotate freely through 360 degrees about axis 550, axis 550 of rotation may also be described as axis 550 of oscillation.

The rotor 520 and the stators 525, 530 are shown as a comb-shaped rotor and comb-shaped stators respectively in FIG. 5. It will be appreciated that in certain embodiments, the rotor 520 and the stators 525, 530 may have other shapes.

For operation, the optical reflector 505 is driven by an electrical signal which causes rotation of the rotor relative to the stator(s).

In certain embodiments, the actuation principle for the optical reflector 505 is electrostatic, such that a potential difference is applied between the rotor 520 and the stator 525 or between the rotor 520 and stator 530. As discussed above, the potential difference applied between the rotor 520 and the stator 525 causes movement (e.g., oscillation) of the rotor in a first direction. The potential difference applied between the rotor 520 and the stator 530 causes movement (e.g., oscillation) of the rotor in a second direction opposite to the first direction.

For example, a voltage may be applied between the rotor combs 535 and the stator combs 540 (of the stator 525 or stator 530). In this state, the rotor combs 535 and corresponding the stator combs 540 interdigitate. The applied voltage attracts the rotor 520 to the stator 525 or stator 530 forcing the mirror 515 to tilt. In other words, when a voltage is applied between the rotor 520 and the stator 525 or stator 530, a torque is developed from the electrostatic field causing the rotor 520 to rotate about the torsional bars 545 toward or away from the stator 525 or stator 530 until the electrostatic torque is balanced by the restoring mechanical torque of the torsional bars 545, or until the driving voltage is turned off or reversed.

In addition, system 500 includes a controller 510 in communication with the optical reflector 505. Controller 510 controls the optical reflector 505. In certain embodiments, the controller 510 drives the optical reflector by providing actuation signals to the optical reflector 505. Furthermore, the controller 510 determines a position attribute of the optical reflector 505. Also, where the system 500 is integrated into or forms a scanning or image projection system, such as but not limited to a scanning laser projector, the controller 510 modifies projection of an image to be projected using the optical reflector 505 based on the position attribute of the optical reflector 505.

As described elsewhere herein, in certain embodiments, the system 500 is implemented as a MEMS-based system. For example, the optical reflector 505 comprises a MEMS-based optical reflector in some embodiments. In certain embodiments, the optical reflector 505 is implemented as a slow axis mirror (vertical scan mirror) of a scanning laser projector.

In certain embodiments, the controllers described herein (e.g., controller 510 of FIG. 5 or controller 215 of FIG. 2) include at least one processor in communication with at least one non-transitory processor-readable medium. The processor-readable medium includes instructions to cause the processors to control the optical reflector 505 as described in relation to the methods and systems described herein. Moreover, in certain embodiments the controllers are free-standing components, while in other examples the controllers are functional modules incorporated into other components of their respective systems. Additionally, the controllers include circuitry and components to control the optical reflector 505. For example, the controller 510 includes circuitry and components to drive the optical reflector 505, and to determine a position attribute of the optical reflector 505, among other functions.

Furthermore, in certain embodiments the controllers or their functionality are implemented in other ways, including: via Application Specific Integrated Circuits (ASICs), in standard integrated circuits, as one or more computer programs executed by one or more computers (e.g., as one or more programs running on one or more computer systems), as one or more programs executed by on one or more controllers (e.g., microcontrollers), as one or more programs executed by one or more processors (e.g., microprocessors, central processing units, graphical processing units), as firmware, and the like, or as a combination thereof.

Figure 6:
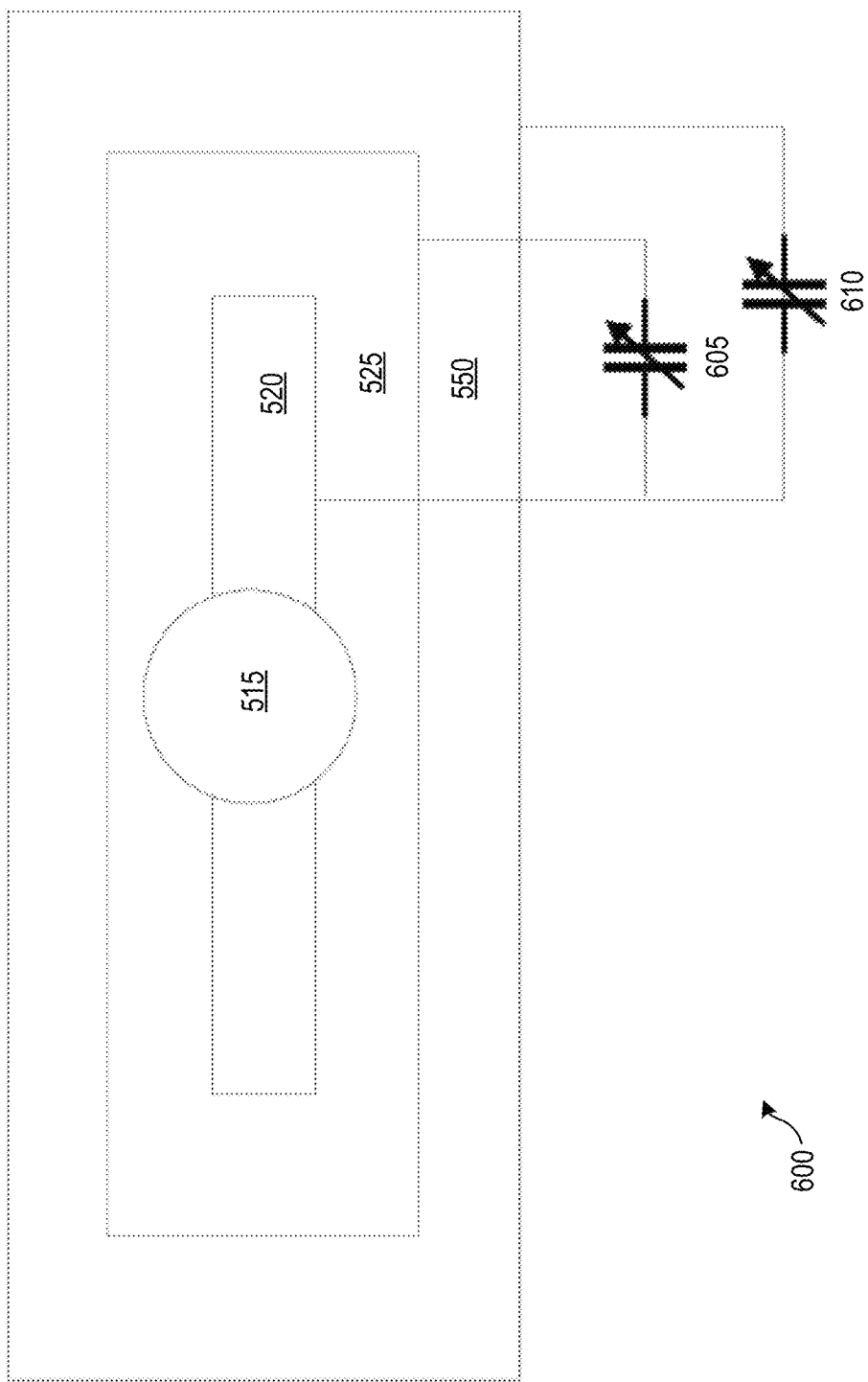
FIG. 6 illustrates an example illustration of capacitances associated with an optical reflector, in accordance with some embodiments.

Turning now to FIG. 6, an example 600 of capacitances associated with the optical reflector 505 is illustrated. As can be seen in FIG. 6, the rotor 520 and the stator 525 form a capacitance 605 between them, and the rotor 520 and the stator 530 form a capacitance 610 between them. In certain embodiments, the first capacitance 605 and the second capacitance 610 include parasitic capacitance of approximately 2 to 6 picofarads (pF). In other embodiments, the parasitic capacitances may have other values.

Depending on the position of the rotor 520 relative to the stators 525, 530 (e.g., due to offset between the rotor combs 535 or stator combs 540 as described above), there is a difference in the capacitance 605 between the rotor 520 and the stator 525, and a capacitance 610 between the rotor 520 and the stator 530. For example, when the optical reflector rotates in a first direction, the capacitance 605, also referred to as a first capacitance, between the rotor 520 and the stator 525 increases due to decreased distance and/or increased surface area between the rotor 520 and the stator 525, and the capacitance 610, also referred to as a second capacitance, between the rotor 520 and the stator 530 decreases due to increased distance and/or decreased surface area between the rotor 520 and the stator 530. Similarly, when the optical reflector rotates in another direction, which may be opposite to the first direction, the first capacitance 605 decreases, and the second capacitance 610 increases.

This difference in capacitances may be used to determine a position attribute of the optical reflector 505. In certain embodiments, the relationship between the first capacitance 605 and the second capacitance 610 is used to determine one or more of a rotation position, an angular displacement, and an angle, of the optical reflector 505. Additional details regarding the determination of such attributes are described in application Ser. No. 17/220,627, titled "Capacitive Angle Sensing of Electrostatic MEMS Mirrors," which is hereby incorporated in its entirety. Moreover, various embodiments may be implemented in which piezoresistive (PZR) or piezoelectric (PZT) sensors are used to measure a mechanical angle of one or more piezoelectric MEMS mirrors.

Figure 7:
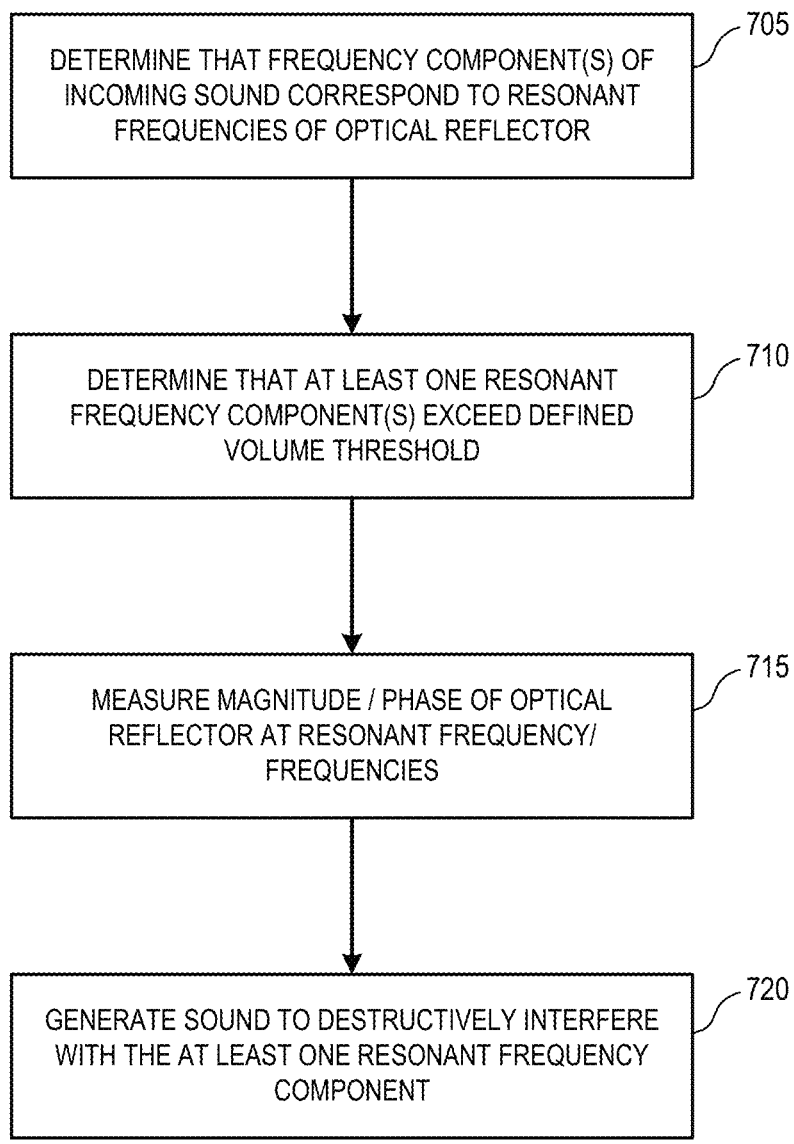
FIG. 7 illustrates an operational routine for a display controller in accordance with some embodiments.

FIG. 7 illustrates an operational routine for a display controller (e.g., controller 215 of FIG. 2 and/or controller 510 of FIG. 5) in accordance with some embodiments. The routine begins at block 705, in which the display controller determines (such as via one or more microphones communicatively coupled to the display controller) that one or more frequency components of an incoming sound correspond to one or more resonant frequencies of an optical reflector communicatively coupled to the display controller. The routine then proceeds to block 710.

At block 710, the display controller determines that at least one of the resonant frequency components of the incoming sound (the one or more frequency components that correspond to the one or more resonant frequencies) exceeds a defined volume threshold. The routine proceeds to block 715.

At block 715, the display controller initiates measuring a magnitude and phase of one or more harmonic motions of the optical reflector, such as in response to the determination that the at least one resonant frequency component exceeds the defined volume threshold. As discussed in greater detail elsewhere herein, such harmonic motions may occur as a result of the resonant frequency components of the incoming sound, and if left unchecked may include harmonic motions that cause various distortion patterns of a display provided by the display controller (e.g., FOV area 106 of the display system 100 of FIG. 1). The routine proceeds to block 720.

At block 720, the display controller initiates the generation of sound (such as via one or more audio speakers communicatively coupled to the display controller) to destructively interfere with the at least one resonant frequency component.

Figure 8:
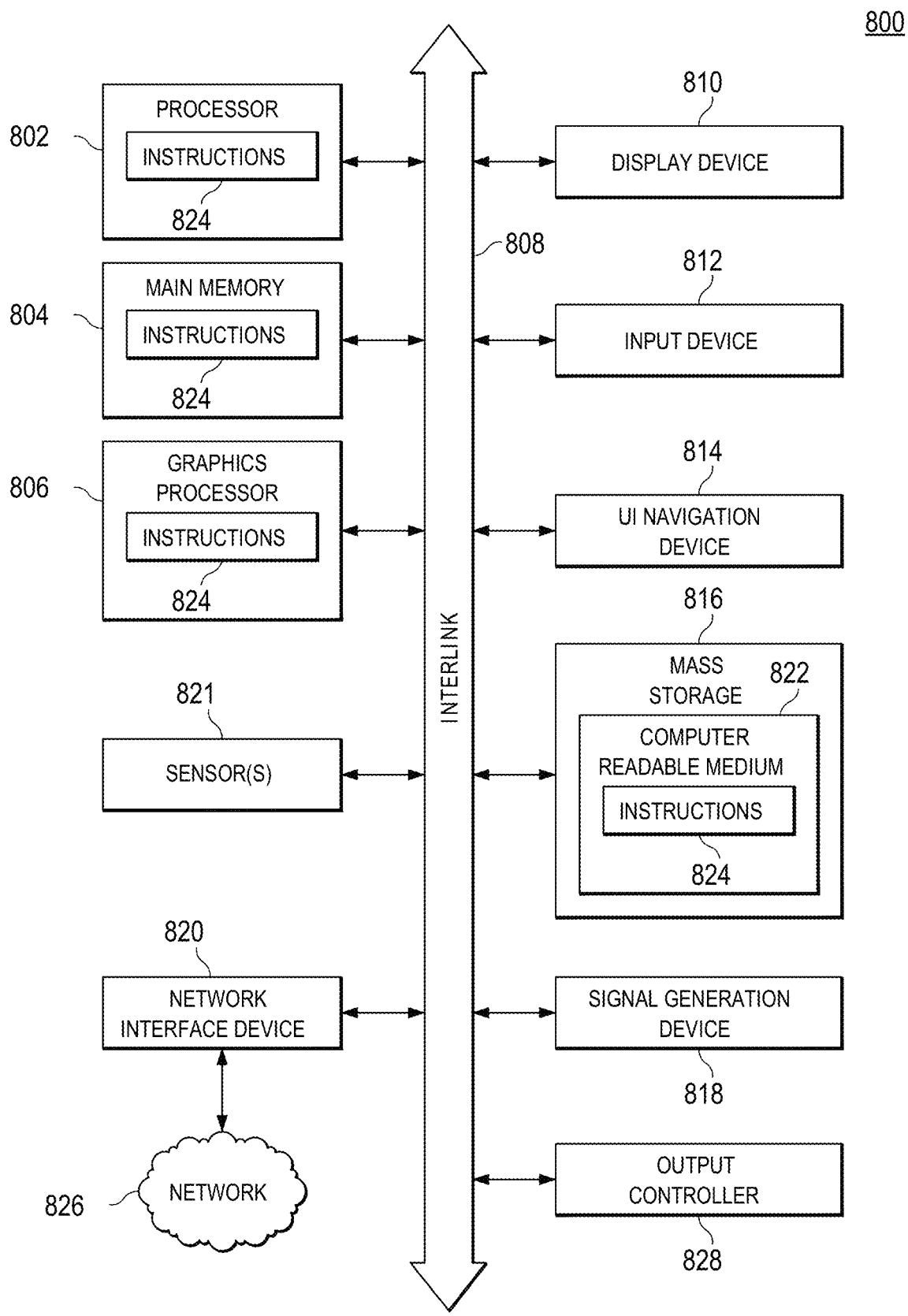
FIG. 8 illustrates a component-level block diagram illustrating an example of an HMD computing system suitable for implementing one or more embodiments.

FIG. 8 is a component-level block diagram illustrating an example of a HMD computing system 800 suitable for implementing one or more embodiments. In alternative embodiments, the HMD computing system 800 operates as a standalone device or may be connected (e.g., networked) to other systems. In various embodiments, one or more components of the HMD computing system 800 is incorporated as or within one or more server computing systems to provide, as one non-limiting example, graphics rendering for display to a user via an incorporating HMD device. It will be appreciated that an associated server computing device may include some components of HMD computing system 800, but not necessarily all of them. In a networked deployment, the HMD computing system 800 operates in the capacity of a server machine, a client machine, or both in server-client network environments. In at least one example, the HMD computing system 800 acts as a peer system in peer-to-peer (P2P) (or other distributed) network environment. The HMD computing system 800 therefore operates in certain embodiments as a server computer, a personal computer (PC), a tablet PC, a set-top box (STB), a mobile computing device, a web appliance, a network router, switch or bridge, or any system capable of executing instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein, such as cloud computing, software as a service (SaaS), other computer cluster configurations.

Examples, as described herein, include, or operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The HMD computing system 800 includes one or more hardware processors 802 (e.g., a central processing unit (CPU), a hardware processor core, or any combination thereof), a main memory 804, and a graphics processing unit (GPU) 806, some or all of which communicate with each other via an interlink (e.g., bus) 808. The HMD computing system 800 further includes a display unit 810 (such as display system 100 of FIG. 1, display system 200 of FIG. 2, or other display device), an alphanumeric input device 812 (e.g., a keyboard or other physical or touch-based actuators), and a user interface (UI) navigation device 814 (e.g., a mouse or other pointing device, such as a touch-based interface) in some embodiments. In one example, the display unit 810, input device 812, and UI navigation device 814 includes a touch screen display. The HMD computing system 800 additionally includes a storage device (e.g., drive unit) 816, a signal generation device 818 (e.g., audio speaker 235 of FIG. 2), a network interface device 820, and one or more sensors 821, such as a microphone (e.g., microphone 230 of FIG. 2), a global positioning system (GPS) sensor, compass, accelerometer, or other sensor. The HMD computing system 800 includes an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 includes a computer readable medium 822 on which is stored one or more sets of data structures or instructions 824 (e.g., software) embodying or utilized by any one or more of the techniques or functions described herein. The instructions 824 also reside, completely or at least partially, within the main memory 804, within GPU 806, or within the hardware processor 802 during execution thereof by the HMD computing system 800. In an example, one or any combination of the hardware processor 802, the main memory 804, the GPU 806, or the storage device 816 constitute computer readable media.

While the computer readable medium 822 is illustrated as a single medium, the term "computer readable medium" includes a single medium or multiple media (e.g., a centralized or distributed database, and/or associated caches and servers) configured to store the one or more instructions 824.

The term "computer readable medium" includes any medium that is capable of storing, encoding, or carrying instructions for execution by the HMD computing system 800 and that cause the HMD computing system 800 to perform any one or more of the techniques of the present disclosure, or that is capable of storing, encoding or carrying data structures used by or associated with such instructions. Non-limiting computer readable medium examples may include solid-state memories, and optical and magnetic media. In an example, a massed computer readable medium includes a computer readable medium with a plurality of particles having invariant (e.g., rest) mass. Accordingly, massed computer readable media are not transitory propagating signals. Specific examples of massed computer readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 are transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 includes one or more physical jacks (e.g., Ethernet, coaxial, or phone jacks) or one or more antennas to connect to the communications network 826. In an example, the network interface device 820 includes a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the HMD computing system 800, and includes digital or analog communications signals or other intangible medium to facilitate communication of such software.

In the description above, certain specific details are set forth in order to provide a thorough understanding of various disclosed implementations. However, one skilled in the relevant art will recognize that implementations may be practiced without one or more of these specific details, or with other methods, components, materials, and the like. In other instances, well-known structures (e.g., those associated with light sources) have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Throughout this specification and the appended claims, the term "carries" and variants such as "carried by" are generally used to refer to a physical coupling between two objects. The physical coupling may be direct physical coupling (i.e. with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, secured to, and/or supported by, with or without any number of intermediary physical objects therebetween.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    determining, by a display controller and via one or more microphones communicatively coupled to the display controller, that one or more frequency components of an incoming sound exceed a defined volume threshold, the one or more frequency components corresponding to one or more resonant frequencies of an optical reflector communicatively coupled to the display controller;
    responsive to the determining, measuring a magnitude and phase of one or more harmonic motions of the optical reflector; and
    generating sound waves to destructively interfere with at least one frequency component of the one or more frequency components.

2. The method of claim 1, wherein generating the sound waves is based at least in part on the measured magnitude and/or measured phase of the one or more harmonic motions.

3. The method of claim 1, wherein the measuring of the magnitude and phase of the one or more frequency components includes determining one or more properties of the optical reflector, the one or more properties comprising at least one of a group that includes a rotation position of the optical reflector, an angular displacement of the optical reflector, or an angle of the optical reflector.

4. The method of claim 1, wherein the measuring of the magnitude and phase is based at least in part on a difference of respective capacitances between a rotor of the optical reflector and a first stator of the optical reflector and between the rotor and a second stator of the optical reflector.

5. The method of claim 1, wherein generating the sound waves is based at least in part on the measured magnitude and phase of the one or more harmonic motions of the optical reflector.

6. The method of claim 1, wherein measuring the magnitude and phase of the one or more harmonic motions of the optical reflector includes measuring the magnitude and phase of the harmonic motions at the one or more resonant frequencies.

7. The method of claim 1, wherein the optical reflector comprises a micro-electromechanical system (MEMS)-based scan mirror.

8. The method of claim 1, wherein at least one of the one or more resonant frequencies of the optical reflector is within a frequency range of 600-660 Hz.

9. The method of claim 1, wherein generating the sound waves is performed via one or more audio speakers communicatively coupled to the display controller, and wherein in operation, the one or more audio speakers are used for user communications and/or user media consumption.

10. The method of claim 1, wherein in operation, the one or more microphones are used for user communications.

11. A display system comprising:
    an optical reflector; and
    a display controller communicatively coupled to the optical reflector and to one or more microphones, the display controller configured to:
        determine, via the one or more microphones, that one or more frequency components of an incoming sound exceed a defined volume threshold, the one or more frequency components corresponding to one or more resonant frequencies of the optical reflector;
        based on the determination that the one or more frequency components exceed the defined volume threshold, measure a magnitude and phase of one or more harmonic motions of the optical reflector; and
        based at least in part on the measured magnitude and/or phase of the one or more harmonic motions, generate sound waves that destructively interfere with at least one frequency component of the one or more frequency components.

12. The display system of claim 11, wherein to generate the sound waves is based at least in part on the measured magnitude and/or measured phase of the one or more harmonic motions.

13. The display system of claim 11, wherein to measure the magnitude and phase of the one or more frequency components includes to determine one or more properties of the optical reflector, the one or more properties comprising at least one of a group that includes a rotation position of the optical reflector, an angular displacement of the optical reflector, or an angle of the optical reflector.

14. The display system of claim 11, wherein to measure the magnitude and phase is based at least in part on a difference of respective capacitances between a rotor of the optical reflector and a first stator of the optical reflector and between the rotor and a second stator of the optical reflector.

15. The display system of claim 11, wherein to generate the sound waves is based at least in part on the measured magnitude and phase of the one or more harmonic motions of the optical reflector.

16. The display system of claim 11, wherein to measure the magnitude and phase of the one or more harmonic motions of the optical reflector includes to measure the magnitude and phase of the harmonic motions at the one or more resonant frequencies.

17. The display system of claim 11, wherein the optical reflector comprises a micro-electromechanical system (MEMS)-based scan mirror.

18. The display system of claim 11, wherein at least one of the one or more resonant frequencies of the optical reflector are within a frequency range of 600-660 Hz.

19. The display system of claim 11, wherein to generate the sound waves includes to generate the sound waves via one or more audio speakers communicatively coupled to the display controller, and wherein in operation, the one or more audio speakers are used for user communications and/or user media consumption.

20. The display system of claim 11, wherein in operation, the one or more microphones are used for user communications.

21. A method comprising:
  in response to determining that one or more frequency components of sound received at a display device exceed a defined volume threshold and correspond to one or more resonant frequencies of an optical reflector of the display device, measuring a magnitude and phase of one or more harmonic motions of the optical reflector; and
  based at least in part on the measuring, generating sound waves to destructively interfere with at least one frequency component of the one or more frequency components.

* * * * *